United States Patent
Leeb et al.

(10) Patent No.: US 8,538,854 B1
(45) Date of Patent: *Sep. 17, 2013

(54) METHOD AND APPARATUS FOR FILTERING AND/OR SORTING RESPONSES TO ELECTRONIC REQUESTS FOR QUOTE

(75) Inventors: Gunter Leeb, Austin, TX (US); Cheryl W. Scott, Austin, TX (US); David J. Reese, Austin, TX (US)

(73) Assignee: Versata Computer Industry Solutions, Inc., Austin, TX (US)

( * ) Notice: Subject to any disclaimer, the term of this patent is extended or adjusted under 35 U.S.C. 154(b) by 712 days.

This patent is subject to a terminal disclaimer.

(21) Appl. No.: 12/691,062

(22) Filed: Jan. 21, 2010

Related U.S. Application Data

(63) Continuation of application No. 09/571,799, filed on May 16, 2000, now Pat. No. 7,653,583.

(51) Int. Cl.
*G06Q 40/00* (2012.01)

(52) U.S. Cl.
USPC .......................................................... 705/37

(58) Field of Classification Search
USPC .......................................................... 705/37
See application file for complete search history.

(56) References Cited

U.S. PATENT DOCUMENTS

| | | | |
|---|---|---|---|
| 4,799,156 A | 1/1989 | Shavit et al. | |
| 4,992,940 A | 2/1991 | Dworkin | |
| 5,732,400 A | 3/1998 | Mandler et al. | |
| 5,758,328 A | 5/1998 | Giovannoli | |
| 5,774,877 A | 6/1998 | Patterson et al. | |
| 5,842,178 A | 11/1998 | Giovannoli | |
| 5,895,454 A | 4/1999 | Harrington | |
| 5,895,468 A | 4/1999 | Whitmyer, Jr. | |
| 5,924,082 A * | 7/1999 | Silverman et al. | 705/37 |
| 5,926,817 A | 7/1999 | Christeson et al. | |
| 5,940,807 A | 8/1999 | Purcell | |
| 5,950,177 A | 9/1999 | Lupien et al. | |
| 5,960,411 A | 9/1999 | Hartman et al. | |
| 5,970,470 A | 10/1999 | Walker et al. | |
| 5,970,472 A | 10/1999 | Allsop et al. | |
| 5,974,406 A | 10/1999 | Bisdikian et al. | |
| 5,978,776 A | 11/1999 | Seretti et al. | |
| 6,014,644 A | 1/2000 | Erickson | |
| 6,061,057 A | 5/2000 | Knowlton et al. | |

(Continued)

OTHER PUBLICATIONS

Kreibig, D., "Record Management Software: Make or Buy?", Oct. 1989, Record management Quarterly, V23, N4, P30(3).*

(Continued)

*Primary Examiner* — Olabode Akintola

(74) *Attorney, Agent, or Firm* — Terrile, Cannatti, Chambers & Holland, LLP; Kent B. Chambers

(57) ABSTRACT

A method and apparatus filters and/or sorts responses to electronic requests for quotes for a product or products offered for sale. The method includes comparing first data of each of a plurality electronic quotes to first data of an electronic request for quote. Each of the plurality of electronic quotes is classified as either a matching quote or a non-matching quote in response to the computer system comparing first data of the plurality electronic quotes and the electronic request for quote. Each matching quote is identified as having first data that equals the first data of the electronic request for quote. Each non-matching quote is defined as having first data that does not equal the first data of the electronic request for quote.

32 Claims, 11 Drawing Sheets

(56) References Cited

U.S. PATENT DOCUMENTS

| | | |
|---|---|---|
| 6,119,101 A | 9/2000 | Peckover |
| 6,125,352 A | 9/2000 | Franklin et al. |
| 6,134,548 A | 10/2000 | Gottsman et al. |
| 6,141,006 A | 10/2000 | Knowlton et al. |
| 6,141,653 A | 10/2000 | Conklin et al. |
| 6,151,588 A | 11/2000 | Tozzoli et al. |
| 6,192,470 B1 | 2/2001 | Kelley et al. |
| 6,295,513 B1 | 9/2001 | Thackston |
| 6,332,135 B1 | 12/2001 | Conklin et al. |
| 6,338,050 B1 | 1/2002 | Conklin et al. |
| 6,505,175 B1 | 1/2003 | Silverman et al. |
| 6,574,608 B1 | 6/2003 | Dahod et al. |
| 6,631,365 B1 | 10/2003 | Neal et al. |
| 6,651,217 B1 | 11/2003 | Kennedy et al. |
| 6,963,847 B1 | 11/2005 | Kennedy et al. |
| 7,653,583 B1 * | 1/2010 | Leeb et al. ............ 705/37 |
| 2003/0216992 A1 | 11/2003 | Say |

OTHER PUBLICATIONS

McCutcheon, D., "The Customization-Responsive Squeeze", Winter 1994, Sloan Management Review V35 N2 p. 89-99.*

Comnes, G.A., The Price of Electricity from Private Power Producers Stage II: Expansion of Sample and Preliminary Statistical Analysis, Lawrence Berkeley Laboratory, Feb. 1995, 134 pages.

Kreibig, D., Record Management Software: Make or Buy? Oct. 1989, Record Management Quarterly, V23, N4, p. 30 (3).

McCutcheon, D., The Customization-Responsive Squeeze, Winter 1994, Sloan Management Review, V35, N2 p. 89-99.

* cited by examiner

*RFQ Template*

| | | | Merchants |
|---|---|---|---|
| Buyer Name | Reffadwercs | | M30 |
| | | | M305 |
| RFQ Name | RFP01 | | M200 |
| | | | M12 |
| Delivery Date | 5/20/2000 | | |

| MFG | SKU | Description | Quantity |
|---|---|---|---|
| IBM | 245 | Laptop | 20 |
| CPQ | 2338 | Desktop | 10 |

FIG. 2

*Quote Template*

| Merchant Name | Austin Dist. | RFQ Name | REP01 |
|---|---|---|---|
| Merchant ID | M305 | Delivery Date | 5/20/2000 |

| MFG | SKU | Description | Quantity | Price |
|---|---|---|---|---|
| IBM | 245 | Laptop | 20 | $25,000 |
| CPQ | 2338 | Desktop | 10 | $10,000 |
| | | | Total | $35,000 |

FIG. 3

| Quote Price | Merchant ID | Products Delivery Date | Classification |
|---|---|---|---|
| $37,500 | M120 | 5/01/2000 | Exact Match |
| $35,000 | M330 | 5/25/2000 | Exact Match |
| $37,000 | M12 | 5/22/2000 | Exact Match |

| Quote Price | Merchant ID | Products Delivery Date | Classification |
|---|---|---|---|
| $25,000 | M92 | 5/25/2000 | Inexact Match |
| $38,000 | M30 | 4/22/2000 | Inexact Match |
| $20,000 | M25 | 5/20/2000 | Inexact Match |
| $35,000 | M8 | 3/10/2000 | Inexact Match |
| $40,000 | M102 | 5/05/2000 | Inexact Match |
| $27,500 | M107 | 4/23/2000 | Inexact Match |
| $42,000 | M200 | 6/20/2000 | Inexact Match |

*FIG. 4a*

| Quote Price | Merchant ID | Products Delivery Date | Classification |
|---|---|---|---|
| $37,500 | M120 | 5/01/2000 | Exact Match |
| $35,000 | M330 | 5/25/2000 | Exact Match |
| $37,000 | M12 | 5/22/2000 | Exact Match |

| Quote Price | Merchant ID | Products Delivery Date | Classification |
|---|---|---|---|
| $25,000 | M92 | 5/25/2000 | Missing Products |
| $38,000 | M30 | 4/22/2000 | Added Products |
| $20,000 | M25 | 5/20/2000 | Missing Products |
| $35,000 | M8 | 3/10/2000 | Substitute Products |
| $40,000 | M102 | 5/05/2000 | Substitute Products |
| $27,500 | M107 | 4/23/2000 | Missing Products |
| $42,000 | M200 | 6/20/2000 | Added Products |

*FIG. 4b*

Exact Matching Quotes To RFQ

| Quote Ranking | Quote Price | Merchant ID | Products Delivery Date |
|---|---|---|---|
| 1 | $35,000 | M330 | 5/25/2000 |
| 2 | $37,000 | M12 | 5/22/2000 |
| 3 | $37,500 | M120 | 5/01/2000 |

Inexact Matching Quotes To RFQ (Added Products)

| Quote Ranking | Quote Price | Merchant ID | Products Delivery Date | Added Product Description |
|---|---|---|---|---|
| 1 | $38,000 | M30 | 4/22/2000 | 3 Printers |
| 2 | $42,000 | M200 | 6/20/2000 | 4 Printers |

Inexact Matching Quotes To RFQ (Missing Products)

| Quote Ranking | Quote Price | Merchant ID | Products Delivery Date | Missing Product Description |
|---|---|---|---|---|
| 1 | $20,000 | M25 | 5/20/2000 | 4 laptop computers |
| 2 | $25,000 | M92 | 5/25/2000 | 6 laptop computers |
| 3 | $27,500 | M107 | 4/23/2000 | 3 desktop computers |

Inexact Matching Quotes To RFQ (Substituted Parts)

| Quote Ranking | Quote Price | Merchant ID | Products Delivery Date | Substituted Product Description |
|---|---|---|---|---|
| 1 | $35,000 | M8 | 3/10/2000 | 2 Printers |
| 2 | $40,000 | M102 | 5/05/2000 | 1 Server |

FIG. 4c

| Quote Ranking | Adjustment Quote Price | Merchant ID | Products Delivery Date | Classification |
|---|---|---|---|---|
| 1 | $35,000 | M330 | 5/25/2000 | Exact Match |
| 2 | $35,000 | M30 | 4/22/2000 | Added Products |
| 3 | $36,000 | M107 | 4/23/2000 | Missing Products |
| 4 | $37,000 | M12 | 5/22/2000 | Exact Match |
| 5 | $37,500 | M120 | 5/01/2000 | Exact Match |
| 6 | $40,000 | M102 | 5/05/2000 | Substitute Products |
| 7 | $40,000 | M200 | 6/20/2000 | Added Products |
| 8 | $40,000 | M8 | 3/10/2000 | Substitute Products |
| 9 | $41,000 | M25 | 5/20/2000 | Missing Products |
| 10 | $41,500 | M92 | 5/25/2000 | Missing Products |

*FIG. 4d*

| Merchant M30 |||||
|---|---|---|---|---|
| This Merchant's Quote Differs From FRQ RFP01 By Added Parts Below |||||
| Added Product | SKU | Quantity | Price/Unit | Manufacturer |
| Printer | 21751-H3 | 3 | $1,000 | HP |

*FIG. 4e*

METHOD AND APPARATUS FOR FILTERING AND/OR SORTING RESPONSES TO ELECTRONIC REQUESTS FOR QUOTE

CROSS-REFERENCE TO RELATED APPLICATION

This application is a continuation of application Ser. No. 09/571,799, filed May 16, 2000 now U.S. Pat. No. 7,653,583, which is incorporated herein by reference in its entirety.

BACKGROUND OF THE INVENTION

1. Field of the Invention

The present invention relates generally processing electronic quotes to sell a product or products which are generated in response to electronic requests for quotes for the product or products, and more particularly the present invention relates to filtering and/or sorting electronic quotes to sell a product or products.

2. Description of the Related Art

Choosing and purchasing products today is a time consuming and difficult task for buyers, especially corporate buyers who are responsible for purchasing large amounts of information technology (IT) equipment (e.g., desk top computers, lap-top computers, servers, software, etc.). Buyers of IT equipment must spend a large amount of time accessing numerous and different sources through a variety of means to research the equipment they need and the merchant from which they want to buy. To obtain the desired products at the least cost and with the right service options, the corporate buyer typically requests quotes from many different merchants, and subsequently selects the most competitive of the quotes generated by the merchants in response to the requests for quotes. To this end, the buyer prepares a general list of products wanted along with other information (e.g., delivery date), and sends the list to a number of merchants via either fax, e-mail, or regular mail. The merchants, in response, generate quotes which are returned to the buyer via e-mail, fax, or regular mail.

Often times, it is quite difficult due to a number of factors for the buyer to efficiently compare merchant quotes to determine the most competitive thereof. One obvious factor is that the buyer may receive a large number of quotes in response to sending a request for quotes to a large number of merchants. Additionally, the quotes can be generated in various formats and returned to the buyer via a number of different delivery mechanisms (e.g., e-mail, regular mail, fax). To facilitate quote comparison when the quotes are in distinct formats and when diverse quote delivery mechanisms are employed, buyers often resort to frustrating task of comparing quotes by placing hard copies of the quotes side by side. The variety of differing formats used by the merchants, likewise frustrates a buyers ability to compare hard copy makes side by side comparison difficult. Corresponding data (e.g., delivery dates, total price, etc.) of the quotes are often difficult to locate due to the varied formats employed. Additionally, the quotes are often inconsistent with each other and/or mismatch the request for quotes. More particularly, as noted above, the buyer initially requests quotes for a specific list products to be purchased. However, one or more or all of the response quotes may be for a list of products which are not identical by type (i.e., stock keeping unit (SKU) or product description) and/or quantity to that specified in the request for quotes. Rather, a quote may be for a list of products which include more or less products in terms of type and/or quantity than was specified in the request. Or, a quote may be for a list of products which includes substitute products for products specified in the request. These quotes mismatch what was specified in the request for quotes and complicate the comparison process for the buyer.

SUMMARY OF THE INVENTION

The present invention relates to filtering and/or sorting responses to electronic requests for quotes for a product or products offered for sale. The invention may be implemented on a computer system and includes the computer system comparing first data of at least one electronic quote to corresponding first data of an electronic request for quote. The computer system generates a signal in response to comparing first data of the at least one electronic quote to corresponding first data of the electronic request for quote. In one embodiment, the signal identifies whether the first data of the at least one electronic quote equals corresponding first data of the electronic request for quote.

BRIEF DESCRIPTION OF THE DRAWINGS

The present invention may be better understood, and it's numerous objects, features and advantages made apparent to those skilled in the art by referencing the accompanying drawings. The use of the same reference number throughout the figures designates a like or similar element.

FIG. 2 illustrates an example of a buyer interface having fields for receiving data for creating a request for quote FIG. 3 illustrates an example of a merchant interface having fields for receiving data for creating a quote;

FIG. 4a illustrates an exemplary display of quotes sorted in accordance with one embodiment of the present invention;

FIG. 4b illustrates an exemplary display of quotes sorted in accordance with another embodiment of the present invention;

FIG. 4c illustrates an exemplary display of quotes sorted in accordance with yet another embodiment of the present invention;

FIG. 4d illustrates an exemplary display of quotes sorted in accordance with yet still another embodiment of the present invention;

FIG. 4e depicts one screen shot which provides information describing the differences between an exemplary inexact matching quote shown in FIG. 4d.

Figure 1:
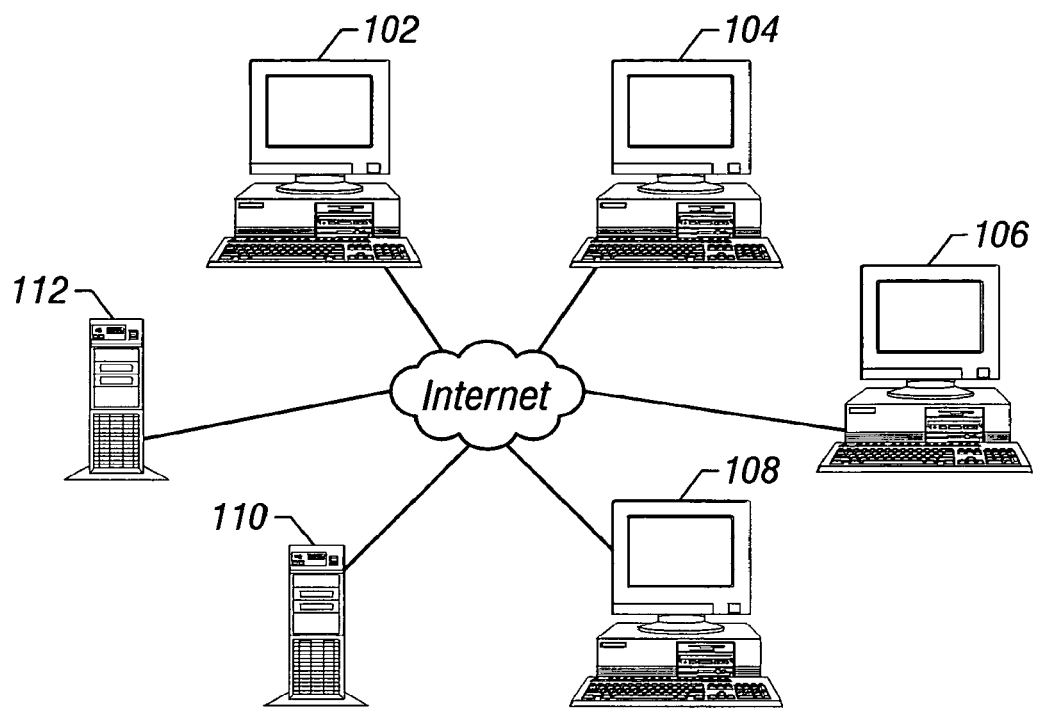
FIG. 1 shows a block diagram of a network interconnected computer systems.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims.

DETAILED DESCRIPTION

The present invention relates to a computer system, a method, or carrier medium comprising instructions executable by a computer system, for filtering and/or sorting electronic quotes created by merchants in response to a buyer creating an electronic request for quotes (RFQs) for product(s). The term "computer system" or "computer" as used herein generally describes hardware components that in combination allow the execution of software programs or algorithms. Hardware generally includes a processor, memory medium, and input/output (I/O) devices. As used herein the term "processor" generally describes the logic circuitry that responds to and processes basic instructions contained in a memory medium. The term "memory medium" includes an installation medium, e.g., a CD ROM, or floppy disks; a volatile computer system memory such as DRAM, SRAM, rambus RAM, etc.; or a non volatile memory such as optical storage or magnetic medium, e.g., a hard drive. The term "memory" is used interchangeably with "memory medium" herein. The memory medium may comprise other types of memory or combinations thereof. In addition, the memory medium may be located in a system in which the software programs are executed, or may be located in a second system that connects to the first system over a network. In this later instance, the second system provides the program instructions to the first computer for execution.

Systems may take various forms. In general, systems can be broadly defined to encompass any device having a processor that executes instructions from a memory medium. Instructions for implementing the present invention on a system can be received by the system via a carrier medium. The carrier medium may include the memory media or storage media described above in addition to a communication medium such as a network and/or wireless link which carries software instructions as signals such as electrical or electromagnetic signals.

FIG. 1 shows a network of computers. More particularly, FIG. 1 shows a network having several client computers 102 through 108 coupled to at least two server computers 110 and 112 via the Internet. The present invention will be described with reference to electronic quotes created in server computer 110 by merchants acting through merchant client computers 104-108 and a web browser, where the quotes are created in response to an RFQ created in server computer 110 by a buyer acting through buyer client computer 102 and a web browser. In this embodiment, the quotes are sorted and/or filtered by server computer 110, and the results are provided to buyer computer 102. It should be understood that the present invention should not be limited to what is described above. For example, the present invention may find application to merchant created quotes received, sorted and/or filtered by buyer computer 102 in response to buyer computer 102 generating and transmitting a request for quotes.

In the first embodiment described above, single server computer 110 performs several functions. Namely server computer system 110: (1) creates and stores RFQs in response to a buyer acting through buyer computer 102 and a web browser; (2) creates and stores quotes responsive to the RFQs in response to merchants acting through merchant computers 104-108 and a web browser, and (3) sorts and/or filters the RFQ responsive quotes, the results of which are presented to buyer via computer 102. In an alternative embodiment, the present invention may find application with respect to a buyer related server computer 110 coupled to a merchant related server computer 112 via a database (not shown in FIG. 1) and a database server computer (not shown in FIG. 1) which shares data between the buyer related server computer 110 and merchant related server computer 112. In this alternative embodiment buyer related server computer 110 creates an RFQ in response to buyer acting through buyer computer 102 and a browser. The RFQ is subsequently; stored in the shared database (not shown in FIG. 1) by buyer related server 110. After the merchants are notified of the RFQ's existence, merchant related server computer 112 creates quotes responsive to the RFQ in response to merchants acting through merchant computers 104-108 and a browser. The RFQ responsive quotes are stored in the shared database (not shown in FIG. 1) by merchant server computer 112. Ultimately, buyer related server computer 110 reads the RFQ responsive quotes from the shared database, and sorts and/or filters the RFQ responsive quotes, the results of which are provided to buyer via buyer computer 102. It should be noted that buyers don't have to use a single buyer server 110 described in this alternative embodiment. Rather there may be multiple buyer servers that all end up sending notifications of an RFQ creation (more fully described below) to merchants who subscribe to multiple merchant aggregator sites. This increases the chance that a merchant will receive an RFQ and thus gain potential business.

The present invention will be described with reference to filtering and/or sorting merchant generated quotes responsive to a buyer generated RFQ for information technology (IT) products, it being understood that the present invention finds application to filtering and/or sorting merchant generated quotes responsive to a buyer generated RFQ for products other than IT products. For example, the present invention may find application with respect to filtering and/or sorting merchant quotes for automotive products, pharmaceutical products, etc. Moreover, while the present invention will be described with reference to products, the present invention may find application in filtering and/or sorting merchant generated quotes for services or a combination of products and services. Additionally, the present invention may find application in filtering and/or sorting merchant generated quotes responsive to requests for information, proposals, or any combination of products, service, information, or proposals.

Buyer, acting through client computer system 102 (referred to as buyer or buyer computer system 102), accesses server computer 110 via a web browser and uses the server computer 110 to create an RFQ therein. The RFQ, once created, may be stored in a memory or database of the server computer 110. Alternatively, the RFQ, once created, may be stored in a separate memory or database coupled to server computer 110. FIG. 2a shows an exemplary user interface or template displayed on a monitor of buyer computer system 102 and used for creating the RFQ. The exemplary template contains fields for receiving RFQ related data entered by the buyer including, for example, a list of products to be purchased that are identified by manufacturer and stock keeping units (SKU), a general description of each product, quantity of each listed product to be purchased, delivery date. The interface could include fields to receive other data such as a more detailed description of product attributes (e.g., speed of microprocessor, size of hard drive, amount of memory, etc, of a computer system to be purchased) for each product, warranty period, service information (e.g., tech. support times and days, response times, etc), due date to create a responsive quote, buyer acceptable substitutes for products to be purchased, maximum price or prices at which buyer will purchase the requested products etc. Application Ser. No.

09/571,182, filed on same day herewith, entitled "Method And Apparatus For Efficiently Responding To Electronic Requests For Quotes," naming Cheryl W. Scott, Gunter Leeb and David J. Reese as inventors, commonly assigned with the present application, and incorporated herein by reference in its entirety, describes several methods for creating the RFQ and for pre-selecting those merchants who are invited to respond thereto.

After the RFQ is created using the server computer 110, notification of the RFQ's existence in the server computer 110 may be sent to pre-selected merchant computer systems 104-108. The notification, in one embodiment, is sent automatically via e-mail to each of the merchant computers 104-108 either by the buyer computer 102 or server computer 110 after creation of the RFQ. As used herein, the term automatically means that a requested activity (e.g., e-mail notification) is performed by a computing means, with minimal involvement by a user thereof. Alternatively, notification can also occur when the merchants use their client software and access server computer system 110 to determine whether RFQs are created therein.

In one embodiment, a global directory, which could contain the identification and/or internet address of the merchants and their employees, could be used as a look up table to identify merchants, or employees thereof, who are to receive notice of an RFQ creation. The global directory could also associate the merchants with several different merchant aggregator sites. In one embodiment, a merchant is notified of the RFQ creation through all of several communication/site channels. This notification allows the merchant to fulfill multiple versions of the same RFQ with a single entry. Otherwise the merchant may see more than one RFQ for the same product set which may lead to the undesirable situation of different employees of the merchant responding to the RFQ with competitive bids.

Merchants, acting through computers 104-108, in response to receiving notification of the RFQ's existence, access server computer 110 via a web browser to read the created RFQ stored in memory or database of server computer 110 or in memory or database coupled to the server computer 110. Thereafter, merchant computers 104-108 access server computer 110 via a web browser to create quotes therein which are responsive to the RFQ. FIG. 3 shows an exemplary user interface or template displayed on a monitor of one or more merchant computers 104-108 and used for creating RFQ responsive quotes. The exemplary template contains fields for receiving data entered by the merchant including, for example, a list of products offered for sale by the merchant that are identified by product manufacturer and SKU, merchant identification, delivery date for the products, quantity of each listed product, a general description of each product, total price at which merchant is willing to sell the listed products of the quote, and the prices of the identified products which make up the total price. It is noted that the exemplary interface may contain other fields for receiving additional data. For example, the interface may contain a more specific description by attribute (e.g., speed of microprocessor, size of hard drive, amount of memory, etc, of a computer system offered for sale) of each product, warranty information, etc.

After the RFQ responsive quotes are created in the server computer 110 and stored in memory or database thereof or coupled thereto, notification of their existence may be sent to buyer computer 102. The notifications, in one embodiment, are sent via e-mail either by respective merchant computers 104-108 or server computer 110. The notifications may be sent automatically.

Once the RFQ responsive quotes are created in server computer 110, the quotes are filtered and/or sorted in accordance with the present invention. If quote filtering is employed, the quotes may be filtered using buyer adjustable, quote filter software executable by the server computer 110 or buyer computer 102. Once filtered and/or sorted, the quotes, or select portions thereof, are provided for review to the buyer via computer system 102.

The server computer system, executing the buyer adjustable filter, may remove quotes from further consideration by the buyer if the quotes do not meet the buyer's preference/rule set. For example, the filter may filter quotes from merchants using a ratings system internal to the system or external to the system, or by a set of favorites in a preference list created by the individual buyer, or by the buyer's employer, or by the manager of a web site through which the buyer must create his RFQ. Thus, if the quote is from a merchant with a rating below a threshold according to the ratings system, or if the quote is from a merchant who is not contained in the preference list, the system filters out the quote from further processing or review. The filter may be set to filter quotes which contain a delivery date later in time than that specified in the RFQ. The filter could be set to filter quotes that do not contain any of the products identified by the corresponding request for quote or which do not include acceptable substitutes to products identified by the corresponding request for quote. It should be noted that the filter is able to filter quotes based on more than one criteria. For example, the filter may filter only those quotes which (1) have a delivery date later in time than that specified in the RFQ and (2) do not contain any of the products identified by the corresponding request for quote.

The filtering feature of the present invention could be turned on or off. When filtering is on, certain quotes, or portions thereof, will be removed from buyer review of the sorted list. If the filtering is turned off, the sorted list will add, at a moment notice, all quotes previously filtered out.

The quotes which remain after filtering, if filtering is performed, are sorted in a logical fashion by sorting software executed by the server computer 110 or buyer computer system 102, before the quotes, or select portions thereof, are displayed in a common format for buyer review. In one embodiment, sorting the quotes includes comparing the quotes to the corresponding RFQ. In another embodiment, sorting the quotes includes comparing the quotes against each other. In still another embodiment, sorting the quotes includes comparing the quotes to the RFQ and to each other. With respect to comparing quotes to each other, the server computer 110 or buyer computer 102 seeks to identify which of the several quotes is the most competitive to the buyer who created the corresponding RFQ. In a preferred embodiment, sorting the quotes includes first comparing the quotes to the RFQ followed by comparing the quotes against each other. FIG. 4a shows an exemplary display of select quote data from each of several quotes after the quotes have been sorted in accordance with one embodiment of the present invention. FIG. 4b shows an exemplary display of select quote data from each of several quotes after the quotes have been sorted in accordance with another embodiment of the present invention. FIG. 4c shows an exemplary display of select quote data from each of several quotes after the quotes have been sorted in accordance with yet another embodiment of the present invention. FIG. 4d shows an exemplary display of select quote data from each of several quotes after the quotes have been sorted in accordance with still yet another embodiment of the present invention.

Figure 5:
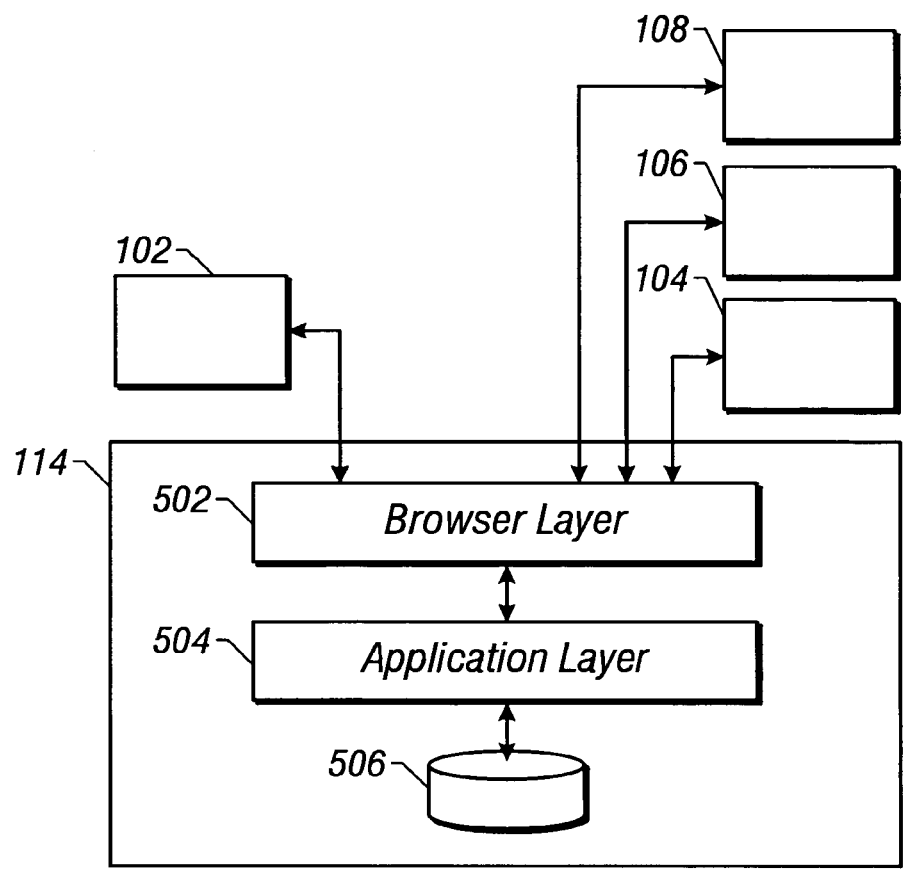
FIG. 5 is a block diagram showing the sever computer system of FIG. 1.

FIG. 5 shows one embodiment of a server computer system 114 in block diagram form which may be used to (1) create and store RFQs, (2) create and store quotes responsive to RFQs, and (3) filter and/or sort quotes responsive to an RFQ. Server computer system 114 shown in FIG. 5 includes a web server layer 502, a database 506 for storing buyer created RFQs and merchant created quotes responsive to the RFQs, and an applications layer 504 where, in one embodiment, RFQ creation is performed, quote creation is performed, and/or quote filtering and/or quote sorting is performed in accordance with a rule based analysis engine which determines an analysis protocol. A more detailed description of the server computer can be found in application Ser. No. 09/571,792, filed on same day herewith, entitled "Method And Apparatus For Processing Requests For Quotations," naming Cheryl W. Scott, Gunter Leeb and David J. Reese as inventors, and commonly assigned with the present application, the application being incorporated herein by reference in its entirety.

Figure 6:
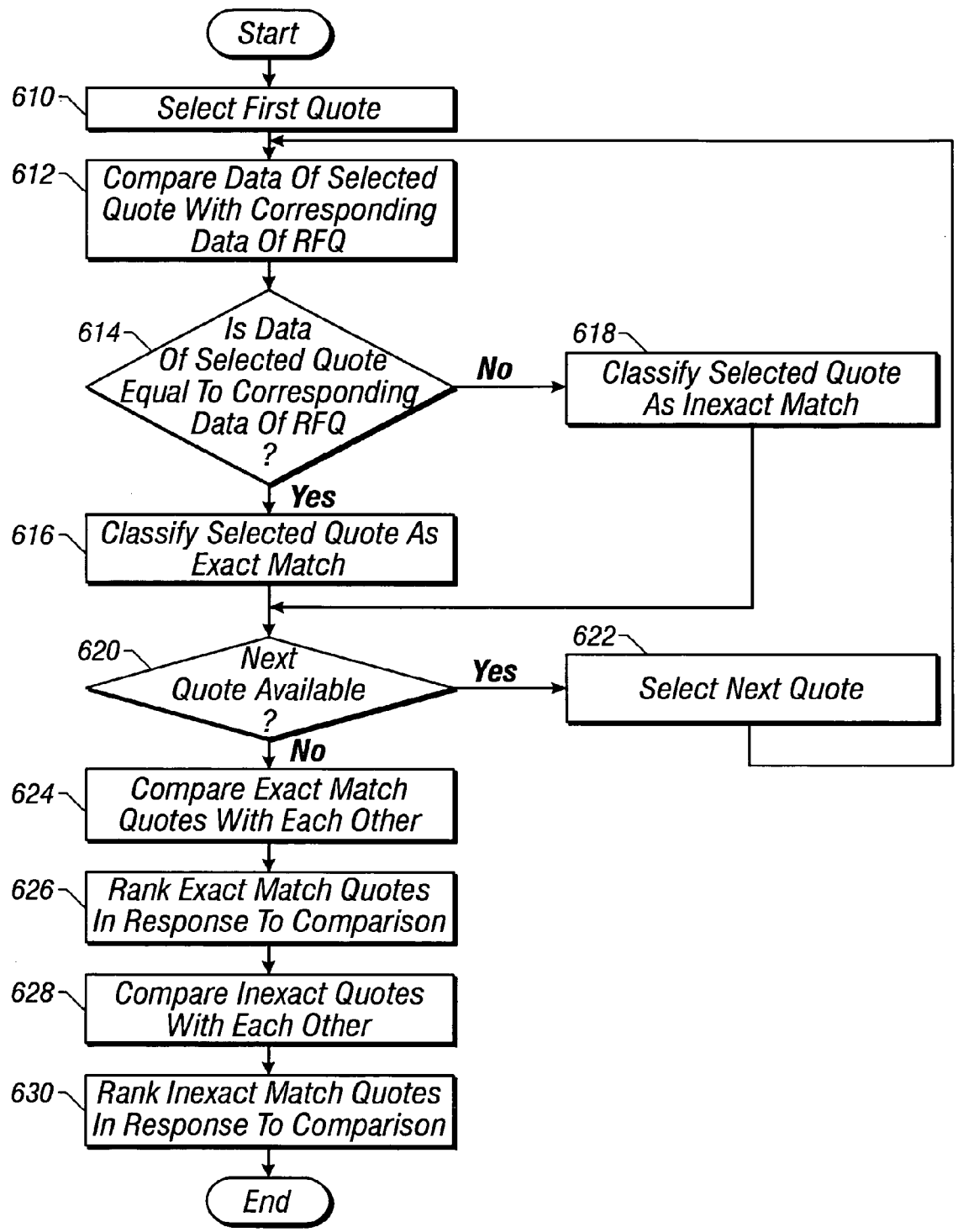
FIG. 6 is a flow chart illustrating operational aspects of sorting quotes according to one embodiment of the present invention.

Again, in the exemplary embodiment described above, quotes are created in response to a buyer creating an RFQ. With continuing reference to FIG. 5, FIG. 6 shows a flow chart illustrating operational aspects of sorting RFQ responsive quotes in accordance with one embodiment of the present invention. This description of FIG. 6 presumes that quote filtering has been performed. In step 610, a first of a plurality of quotes responsive to an RFQ, is selected from database 506. In step 612, data of the selected quote is compared with corresponding data of the RFQ also stored in database 506. For example, the data representing product's SKU contained in the RFQ may be compared to data representing product's SKU contained in the selected quote responsive to the RFQ. In step 614, a decision is made as to whether the compared data is equal. If the compared data is equivalent, then the selected quote is classified as an exact match to the RFQ as shown in step 616. However, if the compared data is not equal, then the selected quote is classified as an inexact match as shown in step 618. In step 620 database 506 is accessed to determine whether all the quotes corresponding to the RFQ have been classified. If it is determined in step 620 that another quote has yet to be classified, the next quote to be classified is selected in step 622 and subsequently classified in steps 612-618. The results of the classification performed in steps 612-620 may be presented to buyer via computer 102.

After all of the quotes have been classified, then in steps 624 and 626, data contained in the quotes classified as exact matches may be compared against each other and ranked according to the comparison. The exact matching quotes may be ranked according any one or more criteria defined by the buyer. For example, the data representing price for products identified in each exact match classified quote may be compared against each other. The exact matching quotes, or portions thereof, may be displayed to buyer via computer 102 after being ranked in steps 624 and 626.

In steps 628 and 630, the quotes classified as inexact matches, may also be compared against each other and subsequently ranked according to the comparison. Alternatively, all quotes whether exact or inexact, may be compared against each other and subsequently ranked according to the comparison. The quotes may be compared and ranked according any one or more criteria as defined by the buyer. For example, the price for the products offered for sale in the quotes may be compared to each other. As will be more fully described below, an adjustment (e.g., price adjustment) in each inexact matching quotes might be required before inexact matching quotes can be compared to each other and/or exact matching quotes. The inexact matching quotes, or portions thereof, may be displayed to buyer via computer 102 after being ranked in steps 628 and 630 by themselves or with the exact matching quotes or portions thereof. Steps 628 and 630 may be optional.

Because it is possible that an inexact matching quote received from one merchant is more appealing to a buyer when compared to all other quotes, including those quotes for products which exactly match the RFQ generated by the buyer, all the quotes generated in response to an RFQ, in one embodiment, may be compared against each other as noted above. Generally, due to their differences, inexact matching quotes cannot be easily compared against each other and to exact matching quotes unless the inexact matching quotes are adjusted, for example, in total price. In an alternative embodiment, after the quotes are classified as exact or inexact in steps 614-618, the inexact quotes can be adjusted to facilitate comparison to each other and to the exact matching quotes. The inexact matching quotes may be adjusted, for example, in total price to reflect their differences when compared to the RFQ. After the inexact matching quotes are adjusted, the inexact matching quotes can be compared and ranked with each other and with the exact matching quotes to identify the most competitive thereof according to buyer selected preferences/rules. Thereafter, all the quotes, or select portions thereof, may be displayed in a list for buyer review via computer 102 in accordance with the ranking. It is noted that the adjustments to quotes performed by server computer, does not alter the merchant offers represented in the quotes. In other words, the quotes generated by the merchants must be accepted by the buyer on an "as is" basis. Nevertheless, it may be economically better for the buyer to accept an inexact matching quote over a matching quote, or an inexact matching quote may lead to a future, more competitive negotiated quote for the products sought to be purchased.

Figure 7:
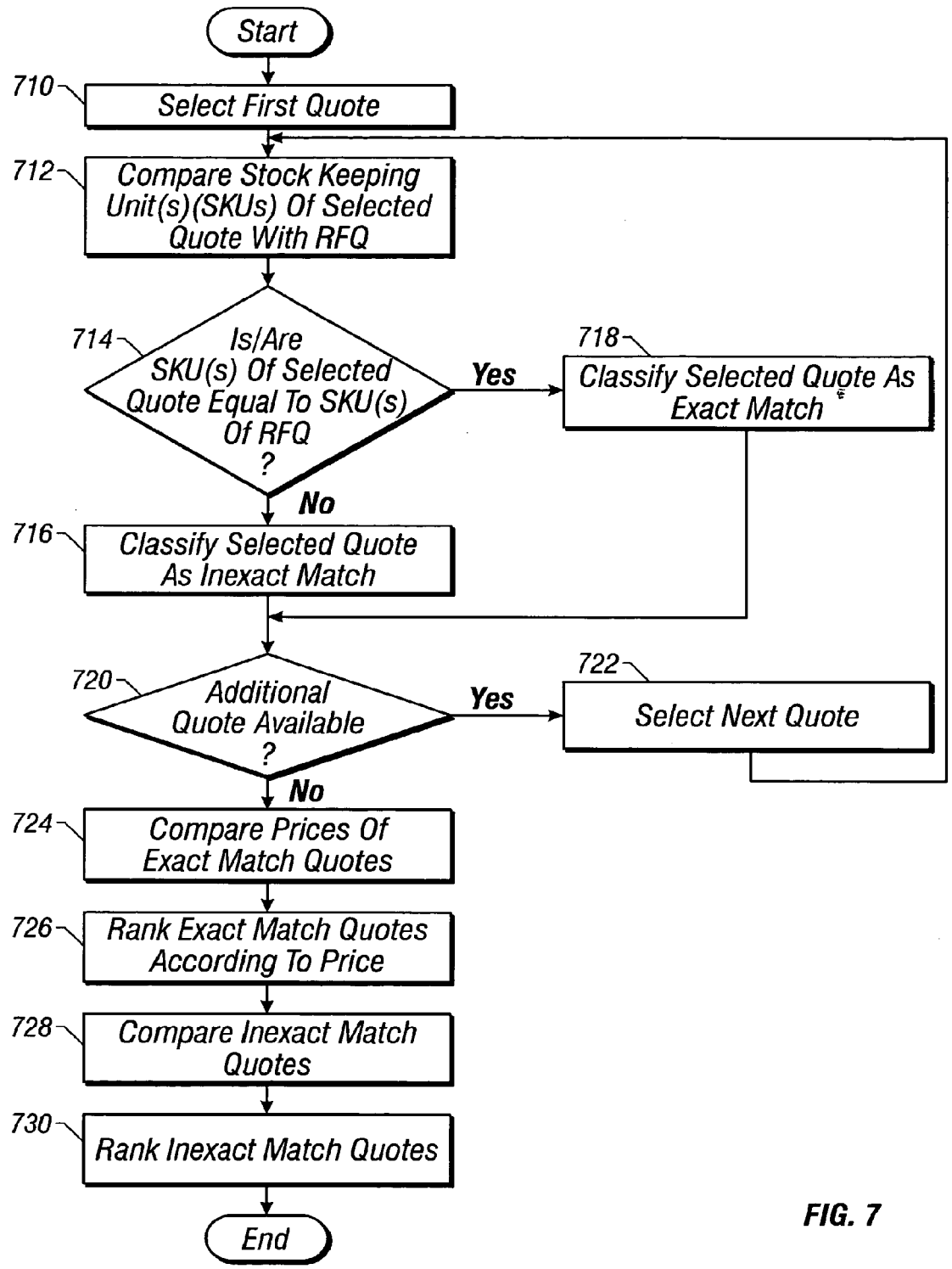
FIG. 7 is a flow chart illustrating operational aspects of sorting quotes by price in accordance with the present invention.

FIG. 7 is a flow chart illustrating operational aspects of an embodiment of the method described with reference to FIG. 6. In step 710, a first of a plurality of quotes is selected from database 506, where the plurality of quotes were created in response to a previously created RFQ. In this exemplary embodiment, the previously generated RFQ identifies SKUs of products and quantities thereof, to be purchased by the buyer, and the responsive quotes each contain SKUs of products and quantities thereof offered for sale by the merchants and a total price at which the merchant is willing to sell the products. In step 712, the SKUs and quantities thereof from the selected quote are compared with the SKUs and quantities of the previously generated RFQ. In step 714, a decision is made as to whether the SKUs and quantities thereof contained in the selected quote and the previously generated RFQ match identically. In this embodiment, identical match is defined to mean that the selected quote contains SKUs and quantities thereof identical to that set forth in the RFQ. In this definition, a quote which contains SKUs different than that specified in the RFQ or quantities different than that specified in the RFQ, will be considered inexact. If the compared SKUs and quantities thereof match identically, then the selected quote is classified as an exact match to the RFQ as shown in step 716. However, if the compared SKUs do not match identically, then the selected quote is classified as an inexact match as shown in step 718.

The present invention should not limit the definition of exact matching quotes to quotes which contain SKUs and associated quantities equal to that contained in the RFQs as set forth above. Exact matching quotes may be defined according to other criteria. For example, as noted above, the RFQ may contain data specifically identifying attributes of a product or products sought to be purchased and quantities thereof. Further, the quotes responsive to this RFQ may contain data specifically identifying attributes of a product or products offered for sale and quantities thereof. In one embodiment, in order to determine whether quotes and corresponding RFQs match, the product attributes and product quantities specified by the RFQ may be compared to the product attributes and product quantities specified in the quotes generated in response to the RFQ. To illustrate, suppose the RFQ is directed to the purchase of eight desktop computer systems, and the RFQ specifically describes the attributes of the eight desktop computer systems to have a microprocessor with a processing speed of 500 MHz, a monitor with a 17 inch display, a RAM memory of 128 MB, and an 8.4 GB hard drive. If a quote responsive to this RFQ is created by a merchant which offers eight desktop computer systems, and the quote specifically describes each desktop computer as having a microprocessor with a processing speed of 500 MHz, a monitor with a 17 inch display, RAM memory of 128 MB, and an 8.4 GB hard drive, then the quote will be classified as an exact match to the RFQ even if the desktop computers are made by a manufacturer other than the one specified in the RFQ. Likewise, if a quote created by a different merchant which offers eight desktop computer systems, and this quote specifically describes each desktop as having a microprocessor with a processing speed of 500 MHz, a monitor with a 17 inch display, RAM memory of 128 MB, but a 4.2 GB hard drive rather than an 8.2 GB hard drive, then the quote will be classified as an inexact match to the RFQ.

In step 720 database 506 is accessed to determine whether all the quotes corresponding to the RFQ have been classified. If it is determined in step 720 that another quote requires classification, that next quote is selected in step 722 and classified in steps 712-718. If all of the quotes have been classified as exact or inexact, the results could be displayed for the buyer as shown. FIG. 4a is an exemplary screen shot illustrating the results of steps 710-722 for sorting example quotes responsive to a corresponding example RFQ.

After all of the quotes have been classified, then in steps 724 and 726, the quotes classified as exact match are compared against each other and ranked according to their comparison. In one embodiment, the exact matching quotes are ranked according to their total price, as shown in steps 724 and 726, with the exact matching quote with the lowest total price being ranked as the most competitive. Data extracted from the exact matching quotes may be displayed for the buyer in a line by line fashion as shown, for example, in FIG. 4b or 4c according to the ranking performed in steps 724 and 726. In optional steps 728 and 730, the quotes classified as inexact matches may be (1) compared against each other and, optionally, against the exact matching quotes, as will be more fully described below, and (2) ranked according to their comparison. Before inexact quotes may be compared with each other, or with the exact matching quotes, and ranked, the inexact matching quotes may need to be adjusted, for example, in total price. Data extracted from the inexact matching quotes may be displayed for the buyer in a line by line fashion as shown, for example, in FIG. 4c after the inexact matching quotes have been compared and ranked against each other according to the steps 728 and 730. Data extracted from the inexact matching quotes may be displayed for the buyer in a line by line fashion as shown, for example, in FIG. 4d after the inexact matching quotes have been compared and ranked against each other and the exact matching quotes according to the steps 728 and 730.

Figure 8A:
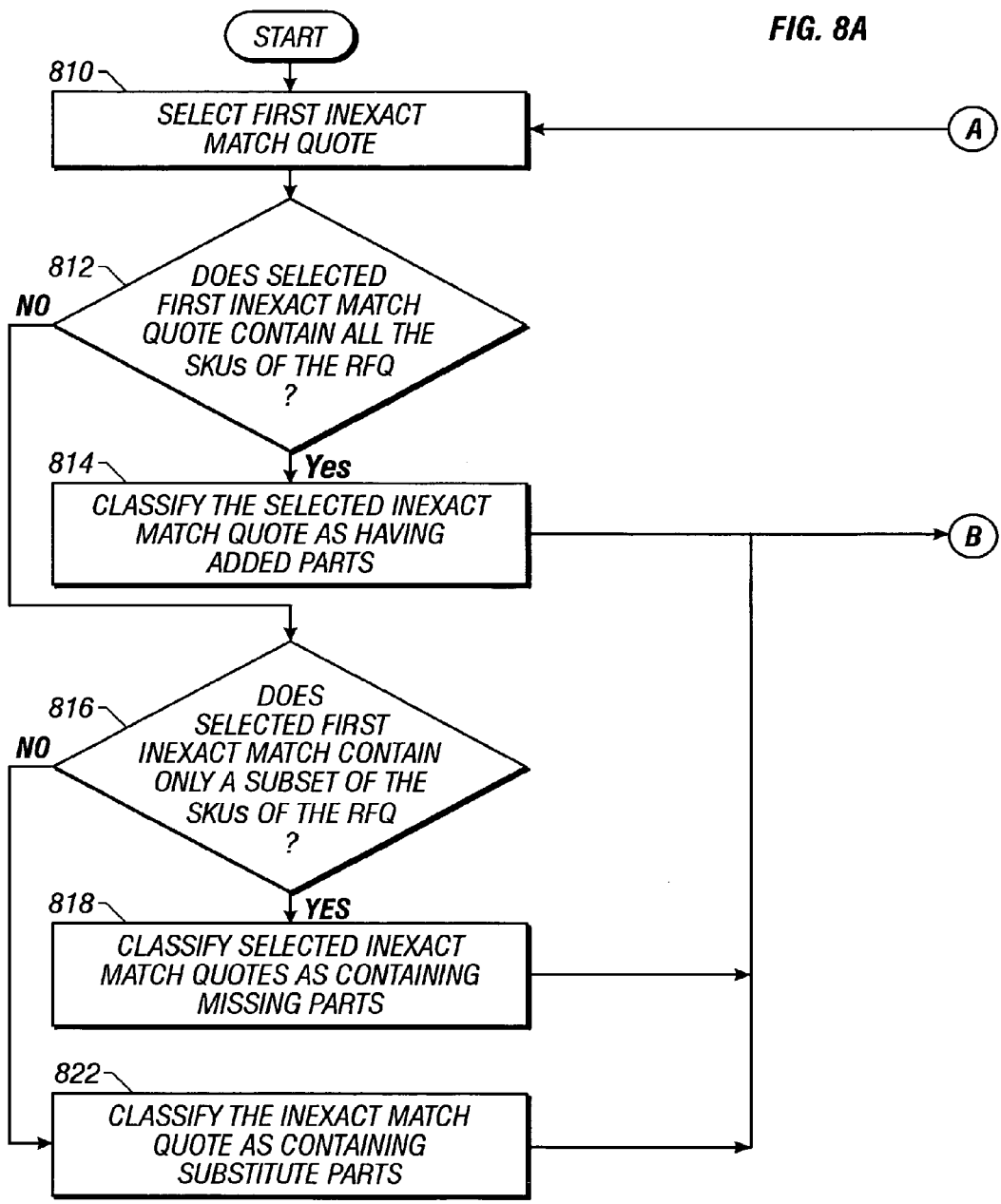
FIGS. 8A and 8B (collectively referred to as FIG. 8) collectively depict a flow chart illustrating one embodiment sorting inexact matching quotes in accordance with the present invention.
Figure 8B:
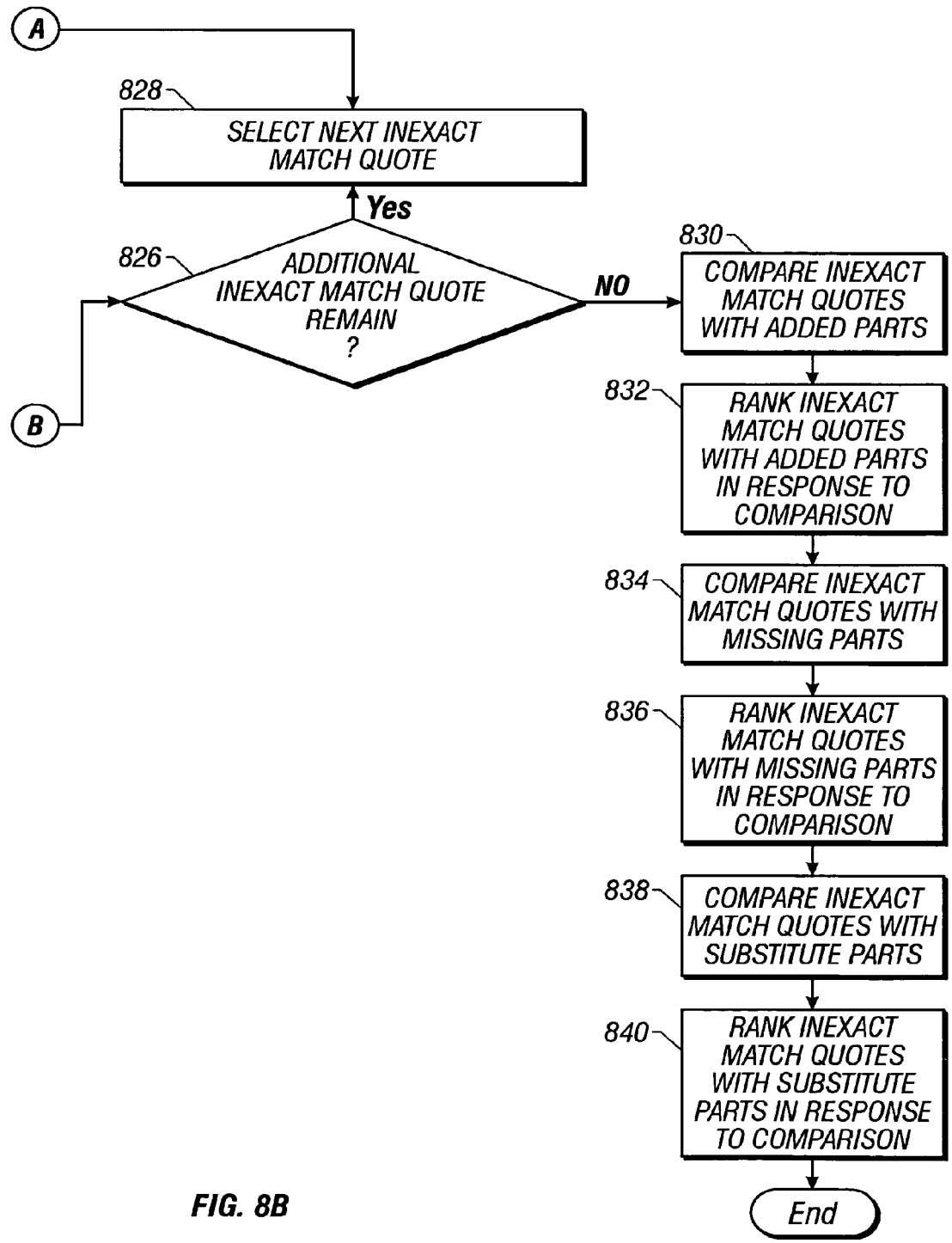

FIG. 8 shows a flowchart illustrating a method by which quotes classified as inexact matches may be further classified and ranked. More particularly, the inexact matches are classified into categories of inexact matching quotes having added parts, inexact matching quotes having missing parts, or inexact matching quotes containing substitute parts. In step 810, the first inexact matching quote is selected. Thereafter in step 812, the selected inexact matching quote is analyzed to determine, for example, whether it contains all of the product SKUs set forth in the corresponding RFQ. If the selected inexact matching quote contains all of the SKUs, then in step 814 the selected inexact matching quote is classified as having added parts. An inexact matching quote classified as having added parts will be considered to have product SKUs or product quantities beyond that set forth in the corresponding RFQ. If the selected inexact matching quote does not contain all of the SKUs of the RFQ then a further analysis is made in step 816. More particularly, in step 816 the selected inexact matching quote is compared to the RFQ to determine whether the SKUs of the inexact matching quote are only a subset of the SKUs of the RFQ. If all the SKUs of the selected inexact matching quote are simply a subset of the SKUs of the RFQ, then the selected inexact matching quote is classified as having missing parts as shown in step 818. Otherwise, the selected inexact matching quote is classified as having substitute parts as shown on step 822.

After each selected inexact matching quote is classified, a determination is made as to whether additional inexact matching quotes remain to be classified as shown in step 826. If additional inexact matching quotes remain, then in step 828 the next inexact matching quote is selected for the comparison process specified in steps 810-822. If all of the inexact matching quotes have been classified, then the inexact matching quotes, or portions thereof may be displayed to a buyer. FIG. 4b is a screen shot which may be provided to the buyer via computer 102 that illustrates the results of classifying an exemplary set of inexact quotes according to steps 810-822.

After the inexact matching quotes have been classified, the inexact matching quotes may be compared and ranked as shown in steps 830 through 840. For example, in step 830, those inexact matching quotes classified as having added parts are compared with each other. In step 832 the inexact matching quotes classified with added parts are ranked according to the comparison step in 830. In step 834, those inexact matching quotes classified as containing missing parts are compared. In step 836 those inexact matching quotes classified with missing parts are ranked according to the comparison step in 834. Lastly in steps 838 and 840 those inexact matching quotes classified as containing substitute parts are compared and ranked. In one embodiment, the inexact matching quotes are ranked according to their price competitiveness. Data from the inexact quotes may be extracted and displayed in a line by line fashion according to their ranking performed in steps 830-840 along with the exact matching quote data as shown, for example, in FIG. 4c.

In FIG. 7, quotes identified as exact matches are compared against each other based on, for example, total price (i.e., the sum of all products multiplied by the quoted price for each). However, quotes identified as exact matches can be compared using other criteria defined by the buyer such as delivery date for the products requested. Additionally, the quotes, either exact or inexact matches may be compared based upon information external to the quotes. For example, each quote may contain an identification of the merchant who created the quote. This merchant identification can be used to access a merchant list which contains information relating to the merchant including a history of transactions between the merchant and buyer, the merchant's qualifications and service offerings, whether the merchant is on a preferred merchant list, etc. This data may be used to rank exact or inexact matching quotes.

The inexact quotes when categorized according to the steps set forth in FIGS. 7 and 8, can be compared against each other and/or the exact matching quotes despite differences therebetween. To make inexact quotes comparable to each other and to exact matching quotes, the differences can be translated into a dollar value, and the translated dollar value can be used to adjust the total price set forth in each quote. In this fashion, each inexact matching quote may have two totals: a real total as prepared by the merchant and an adjusted total calculated for comparison purposes.

The translation of differences in quotes into a dollar value adjustment may be performed in accordance with the inexact matching quote's classification (e.g., added parts, missing parts, or substitute parts) or with predetermined preferences of the buyer. For example, with respect to inexact quotes classified as having added parts, the adjusted total price can be calculated by multiplying each added part by its respective offering price and subtracting the result from the real price. With respect to inexact matching quotes having missing parts, the adjusted price can be calculated by multiplying the missing parts by a street price (i.e., a non-negotiated price or an average market price at which the missing part can be purchased from a merchant of the missing part), and adding the result to the real price.

With respect to inexact matching quotes having substitute parts, a determination may be made as to whether the substituted part or parts is acceptable to the buyer. This could be done with a series of screens may be presented to the buyer asking during the ranking process to determine whether a particular substitution is acceptable. Alternatively, a predetermined set of preferences and/or rules may be predefined by the buyer to determine what are acceptable RFQ substitute parts. The predetermined set of preferences and/or rules for acceptable substitutes could take form in a decision tree which is created from buyer's answers to questions regarding potential substitute products. For example, during an automated question and answer process during which the decision tree is being built, a buyer may indicate that he would be willing to substitute a desktop computer system that contains a 500 MHz microprocessor for a requested desktop computer system that contains a 450 MHz microprocessor, or the buyer may indicate that he would be willing to substitute a desktop computer system that contains a 500 MHz microprocessor for a requested desktop computer system that contains a 450 MHz microprocessor if the 500 MHz system is less than X dollars.

If the substitute parts in an exact matching quote are deemed acceptable, inexact matching quotes having substituted parts could be processed in one of several different ways. For example, the inexact matching quote with substitute parts could be transformed into an inexact matching quotes having missing parts, by multiplying each substitute part by its respective price and subtracting the result from the real price. The transformed inexact matching quote having substitute parts could then be processed as an inexact matching quote having missing parts. In an alternative embodiment of processing inexact matching quotes having substitute parts, the inexact matching quote could be reclassified into an exact matching quote without any price adjustment. For example, suppose that an inexact matching quote contains a desktop computer system with a 500 MHz processor which is an acceptable substitution for a desktop computer system with a 450 MHz processor set forth in a corresponding RFQ, and the substituted system is priced by the offering merchant within X dollars. This quote could be reclassified as an exact match containing missing parts without adjustment to its real price as described above.

In still another alternative, a normalization algorithm may be used to adjust the real total price of an inexact matching quote containing substituted parts. Evaluation criteria may vary from product to product. As an example, a quote may contain an offer to sell a 500 MHz desktop computer system with a comparable microprocessor for Y dollars in substitution for a 450 MHz desktop computer system set forth in an RFQ. The price per MHz could be used as the normalization in this case and would give a value per MHz which, in turn, could be used to show that buyer would by buying the substituted desktop system for Z dollars less per MHz.

Thus, even though an inexact quote may not contain identity of products and quantities when compared to the corresponding RFQ, the difference in quantity or quantities may be reflected in the adjusted total price which in turn can be used for comparing inexact quotes to each other and to exact quotes. The adjusted price may also reflect perceived values according to merchant ranking and merchant service offers. For example, a percentage could be added/subtracted from the real price total for merchants off/on a preferred merchants list. After inexact matching quotes have been adjusted, compared against each other and the exact matching quotes, and ranked based on, for example, the real or adjusted price, the quotes, or portions thereof may be displayed for the buyer in a line by line fashion as shown, for example, in FIG. 4d according to the ranking described above.

The present invention also allows the buyer to click on an inexact quote, or portion thereof, displayed on computer 102 to enable the buyer to view the differences between the inexact quote and the RFQ. FIG. 4e shows one screen shot which provides information describing the differences between an exemplary inexact matching quote shown in FIG. 4d.

Although the present invention have been described in connection with several embodiments, the invention is not intended to be limited to the specific forms set forth herein, but on the contrary, it is intended to cover such alternatives, modifications, and equivalents as can be reasonably included with in the spirit and scope of the invention as defined by the appended claims.

What is claimed is:

1. A method comprising:
   a computer system comparing a first portion of data relating to an offer to sell products and a first portion of data relating to a request for the offer to sell products;
   the computer system, in a response to comparing the first portion of data relating to the offer to sell products and the first portion of data relating to the request for the offer to sell products, generating a signal that indicates the offer is an exact match with the request if the first portions of data match and indicates the offer is an inexact match with the request if the first portions of data do not match;
   the computer system adjusting at least a subset of the inexact matches to allow comparison between the exact matching offers and the adjusted inexact matching offers;
   the computer system comparing the adjusted inexact matching offers and the exact matching offers; and
   the computer system generating data to display the comparison between the exact matching offers and the adjusted inexact matching offers.

2. The method of claim 1, wherein the signal indicates whether the first portion of data relating to the offer to sell products compares equally or unequally to the first portion of the data relating to the request for the offer to sell products.

3. The method of claim 1 wherein adjusting at least a subset of the inexact matches comprises:

translating differences between the adjusted inexact match offers and requests into a comparable monetary value adjustment.

4. The method of claim 1 further comprising:
the computer system ranking the adjusted non-matching quotes.

5. The method of claim 1 further comprising:
the computer system classifying the adjusted inexact matching offers into groups comprising (i) having added parts, (ii) having missing parts, or (iii) having substitute parts.

6. The method of claim 1 further comprising:
providing the data to display the comparison between the exact matching offers and the adjusted inexact matching offers to another computer system.

7. An apparatus comprising:
a processor; and
a memory coupled to the processor, wherein the memory includes code stored therein that is executable by the processor for:
comparing a first portion of data relating to an offer to sell products and a first portion of data relating to a request for the offer to sell products;
in response to comparing the first portion of data relating to the offer to sell products and the first portion of data relating to the request for the offer to sell products, generating a signal that indicates the offer is an exact match with the request if the first portions of data match and indicates the offer is an inexact match with the request if the first portions of data do not match;
adjusting at least a subset of the inexact matches to allow comparison between the exact matching offers and the adjusted inexact matching offers, wherein adjusting at least a subset of the inexact matches comprises applying a normalization algorithm to the inexact matching offers;
comparing the adjusted inexact matching offers and the exact matching offers; and
generating data to display the comparison between the exact matching offers and the adjusted inexact matching offers.

8. The apparatus of claim 7, wherein the signal indicates whether the first portion of data relating to the offer to sell products compares equally or unequally to the first portion of the data relating to the request for the offer to sell products.

9. The apparatus of claim 7 wherein the code that is executable by the processor for adjusting at least a subset of the inexact matches further comprises additional code that is executable by the processor for translating differences between the adjusted inexact match offers and requests into a comparable monetary value adjustment.

10. The apparatus of claim 7 wherein the code is further executable by the processor for:
ranking the adjusted non-matching quotes.

11. The apparatus of claim 7 wherein the code is further executable by the processor for:
classifying the adjusted inexact matching offers into groups comprising (i) having added parts, (ii) having missing parts, or (iii) having substitute parts.

12. The apparatus of claim 7 wherein the code is further executable by the processor for:
providing the data to display the comparison between the exact matching offers and the adjusted inexact matching offers to another computer system.

13. A method comprising:
a computer system comparing first data of each of a plurality electronic quotes to first data of an electronic request for quote;
the computer system classifying each of the plurality of electronic quotes as either a matching quote or a non-matching quote in response to the computer system comparing first data of each of the plurality electronic quotes to first data of the electronic request for quote, wherein each matching quote comprises first data that equals the first data of the electronic request for quote, and wherein each non-matching quote comprises first data that does not equal the first data of the electronic request for quote;
the computer system ranking each of the matching electronic quotes, wherein each matching electronic quote is ranked as a function of second data contained in therein;
the computer system adjusting at least a subset of the non-matching quotes to allow comparison between the exact matching quotes and the adjusted non-matching quotes;
the computer system comparing the adjusted non-matching quotes and the exact matching quotes; and
the computer system generating data to display the comparison between the exact matching offers and the adjusted inexact matching offers.

14. The method of claim 13 further comprising the computer system ranking each of the non-matching quotes, wherein each non-matching electronic quotes is ranked as a function of second data contained therein.

15. The method of claim 13 wherein the electronic quote comprises data relating to products offered for sale, and wherein the electronic request for quotes comprises data relating to products to be purchased.

16. The method of claim 13 wherein the first data comprises a product identification number corresponding to a product to be purchased, and wherein the second data comprises a price at which the product is offered for sale.

17. The method of claim 13 wherein adjusting at least a subset of the non-matching quotes comprises:
translating differences between the adjusted non-matching quotes and requests into a comparable monetary value adjustment.

18. The method of claim 14 further comprising:
the computer system classifying the adjusted inexact matching offers into groups comprising (i) having added parts, (ii) having missing parts, or (iii) having substitute parts.

19. The method of claim 13 further comprising:
providing the data to display the comparison between the exact matching offers and the adjusted inexact matching offers to another computer system.

20. A nontransitory computer readable medium having code stored therein that is executable by a processor for:
comparing a first portion of data relating to an offer to sell products and a first portion of data relating to a request for the offer to sell products;
in response to comparing the first portion of data relating to the offer to sell products and the first portion of data relating to the request for the offer to sell products, generating a signal that indicates the offer is an exact match with the request if the first portions of data match and indicates the offer is an inexact match with the request if the first portions of data do not match;
adjusting at least a subset of the inexact matches to allow comparison between the exact matching offers and the adjusted inexact matching offers, wherein adjusting at least a subset of the inexact matches comprises applying a normalization algorithm to the inexact matching offers;

comparing the adjusted inexact matching offers and the exact matching offers; and generating data to display the comparison between the exact matching offers and the adjusted inexact matching offers.

21. The computer readable medium of claim 20 wherein the signal indicates whether the first portion of data relating to the offer to sell products compares equally or unequally to the first portion of the data relating to the request for the offer to sell products.

22. The computer readable medium of claim 20 wherein the code that is executable by the processor for adjusting at least a subset of the inexact matches further comprises additional code that is executable by the processor for translating differences between the adjusted inexact match offers and requests into a comparable monetary value adjustment.

23. The computer readable medium of claim 20 wherein the code is further executable by the processor for:
ranking the adjusted non-matching quotes.

24. The computer readable medium of claim 20 wherein the code is further executable by the processor for:
classifying the adjusted inexact matching offers into groups comprising (i) having added parts, (ii) having missing parts, or (iii) having substitute parts.

25. The computer readable medium of claim 20 wherein the code is further executable by the processor for:
providing the data to display the comparison between the exact matching offers and the adjusted inexact matching offers to another computer system.

26. An apparatus comprising:
a first computer system configured to receive a plurality of data transmitted from a plurality of respective second computer systems, respectively, wherein each of the plurality of data represents an offer to sell at least one product;

wherein the first computer system is configured to receive data relating to a request for the offer to sell at least one product;

wherein the first computer system is configured to compare a first portion of each of the plurality of data to a first portion of the data relating to a request for the offer to sell at least one product;

wherein the first computer system, in response to comparing the first portion of each of the plurality of data to the first portion of data relating to the request for the offer to sell at least one product, is configured to generate a plurality of signals, wherein each of the plurality of signals indicates whether the corresponding first portion of one of the plurality of data compares equally or unequally to the first portion of the data relating to the request for the offer to sell at least one product;

wherein the computer system is configured to determine the offer is an exact match with the request if the first portions of data compare equally and determine the offer is an inexact match with the request if the first portions of data compare unequally;

wherein the computer system is configured to adjust at least a subset of the inexact matches to allow comparison between the exact matching offers and the adjusted inexact matching offers;

wherein the computer system is configured to compare the adjusted inexact matching offers and the exact matching offers; and wherein the computer system is further configured to generate data to display the comparison between the exact matching offers and the adjusted inexact matching offers.

27. The apparatus of claim 26 wherein the computer system is further configured to classify the adjusted inexact matching offers into groups comprising (i) having added parts, (ii) having missing parts, or (iii) having substitute parts.

28. The apparatus of claim 26 wherein to adjust at least a subset of the inexact matches comprises to apply a normalization algorithm to the inexact matching offers.

29. The apparatus of claim 26 wherein to adjust at least a subset of the inexact matches comprises to translate differences between the adjusted inexact match offers and requests into a comparable monetary value adjustment.

30. A method comprising:
a first computer system receiving a plurality of data transmitted from a plurality of respective second computer systems, respectively, wherein each of the plurality of data represents an offer to sell at least one product;

the first computer system receiving data relating to a request for the offer to sell at least one product;

the first computer system comparing a first portion of each of the plurality of data to a first portion of the data relating to a request for the offer to sell at least one product;

the first computer system, in response to comparing the first portion of each of the plurality of data to the first portion of data relating to the request for the offer to sell at least one product, genearting a plurality of signals, wherein each of the plurality of signals indicates whether the corresponding first portion of one of the plurality of data compares equally or unequally to the first portion of the data relating to the request for the offer to sell at least one product;

the computer system determining the offer is an exact match with the request if the first portions of data compare equally and determine the offer is an inexact match with the request if the first portions of data compare unequally;

the computer system adjusting at least a subset of the inexact matches to allow comparison between the exact matching offers and the adjusted inexact matching offers, wherein to adjust at least a subset of the inexact matches comprises applying a normalization algorithm to the inexact matching offers; and the computer system comparing the adjusted inexact matching offers and the exact matching offers.

31. The apparatus of claim 30 wherein adjusting at least a subset of the inexact matches comprises applying a normalization algorithm to the inexact matching offers.

32. The apparatus of claim 30 wherein adjusting at least a subset of the inexact matches comprises:
translating differences between the adjusted inexact match offers and requests into a comparable monetary value adjustment.

* * * * *